United States Patent [19]

Hashimoto et al.

[11] Patent Number: 4,694,040

[45] Date of Patent: Sep. 15, 1987

[54] LIQUID COMPOSITION FOR FORMING A COATING FILM OF ORGANOPOLYSILOXANE AND METHOD FOR THE PREPARATION THEREOF

[75] Inventors: Akira Hashimoto, Yokohama; Toshihiro Nishimura, Kawasaki; Muneo Nakayama, Tokyo; Hisashi Nakane, Kawasaki; Shozo Toda, Chigasaki, all of Japan

[73] Assignee: Tokyo Denshi Kagaku Kabushiki Kaisha, Kanagawa, Japan

[21] Appl. No.: 902,029

[22] Filed: Aug. 25, 1986

Related U.S. Application Data

[63] Continuation of Ser. No. 756,612, Jul. 9, 1985, abandoned, which is a continuation of Ser. No. 576,617, Feb. 3, 1984, abandoned, which is a continuation of Ser. No. 420,620, Sep. 21, 1982, abandoned.

[30] Foreign Application Priority Data

Dec. 7, 1981 [JP] Japan .............................. 56-196532

[51] Int. Cl.$^4$ .............................................. C08K 5/05
[52] U.S. Cl. .................................... 524/765; 524/770; 524/773; 524/858; 528/10; 528/12; 528/14; 528/20; 528/35; 556/459; 556/462; 556/463
[58] Field of Search ...................... 556/459, 462, 463; 524/770, 773, 765, 858; 528/10, 12, 14, 20, 35

[56] References Cited

U.S. PATENT DOCUMENTS

| | | | |
|---|---|---|---|
| 3,325,449 | 6/1967 | Ceyzeriat et al. | 556/459 |
| 3,786,015 | 1/1974 | Merrill | 260/32.8 |
| 4,158,714 | 1/1979 | Brichta et al. | 428/392 |
| 4,226,793 | 10/1980 | Kotzsch et al. | 556/470 |
| 4,399,266 | 8/1983 | Matsumura et al. | 556/459 |
| 4,499,224 | 2/1985 | Anthony et al. | 524/261 |

Primary Examiner—Melvyn I. Marquis
Attorney, Agent, or Firm—Wyatt, Gerber, Shoup, Scobey and Badie

[57] ABSTRACT

The invention provides a novel means for providing a highly heat-resistant and corrosion-resistant coating film on the surface of a substrate such as a semiconductor silicon wafer or glass plate by coating the surface with a liquid coating composition which is a solution of an oligomeric organopolysiloxane as a partial dehydration-condensation product of a monohydrocarbylsilane triol RSi(OH)$_3$, optionally, with admixture of a dihydrocarbylsilane diol R$_2$Si(OH)$_2$, R being a monovalent hydrocarbon group, e.g. methyl or phenyl, in an organic solvent followed by baking of the coated substrate to convert the coating layer into a cured resin film.

8 Claims, No Drawings

LIQUID COMPOSITION FOR FORMING A COATING FILM OF ORGANOPOLYSILOXANE AND METHOD FOR THE PREPARATION THEREOF

This is a continuation of application Ser. No. 756,612 filed July 9, 1985 and now abandoned, which was a continuation of application Ser. No. 576,617 filed Feb. 3, 1984, now abandoned, which is a continuation of Ser. No. 420,620 filed Sept. 21, 1982, now abandoned.

BACKGROUND OF THE INVENTION

The present invention relates to a novel liquid composition suitable for forming a highly heat-resistant coating film of an organopolysiloxane and a method for the preparation thereof.

Needless to say, heat resistance is one of the most important requirements for various kinds of synthetic resins used in a variety of applications. In this connection, numbers of heat-resistant synthetic resins have been developed including, for example, polyphenylenes, polyimides, polyquinoxalines, polyisoindroquinazolinediones, polytriazines, fluorocarbon resins, silicone resins, chelate resins and the like.

Typically, most strongest demand for such a heat-resistant polymeric material is increasingly laid by the electronics industry or, in particular, the material industry for electronics technology, in which the heat-resistant polymeric material is desired to withstand a temperature as high as 400° C. or higher in addition to good electric insulation as a matter of course for an electric material. Nevertheless, most of the above named conventional heat-resistant polymeric materials are utilizable practically at a temperature not exceeding 300° C. at the highest. In addition, no good solvents are available for preparing a solution of these polymers so that liquid compositions can hardly be obtained of these heat-resistant polymers suitable for film coating.

Limiting the subject matter to the silicone resins, i.e. organopolysiloxane resins, there have been proposed so-called organopolysiloxane ladder polymers composed of the trifunctional organosiloxane units only and expressed by the formula $(RSiO_{1.5})_n$, in which R is a monovalent hydrocarbon group and n is a positive integer corresponding to the number of the siloxane units in a molecule. These ladder polymers are deemed to be the most promising among silicone resins as a material to be used in electronics in respect of the outstanding heat resistance and electric properties although these ladder polymers have a fatal defect as a material used in electronics due to the difficulty in completely removing the impurities of alkali metal and chlorine ions unavoidably entering the polymer in the course of preparation. In addition, the ladder polymers have several problems in respect of the relatively low solubility in organic solvents, low storability, poor spreadability on the substrate surface when a coating film is to be formed thereon, cracking of the coating film by backing at an elevated temperature and so on so that they are never quite satisfactory as a material for forming coating films. Of course, properties of the ladder polymers can widely be modified by selecting the hydrocarbon groups denoted by R in the above formula, which can be a group with bulkiness such as an aryl group, e.g. phenyl, tolyl and naphthyl groups, as well as an isobutyl and isoamyl groups or a group with compactness such as a methyl group. However, the ladder polymers with those bulky hydrocarbon groups have disadvantageously low solubility in a solvent while the ladder polymers having methyl groups are poorly storable in addition to the little improved solubility in solvents so that no liquid coating compositions can be prepared thereof with difficulties in handling.

Accordingly, no liquid coating compositions have yet been developed of an organopolysiloxane as the base ingredient despite the eager demand for such a composition capable of giving a coating film having satisfactorily high heat resistance along with excellent electric properties suitable as a material to be used in the electronics technology.

SUMMARY OF THE INVENTION

It is therefore the primary object of the present invention to provide a means for forming a coating film of a polymeric material, which is highly heat-resistant at a temperature of 400° C. or even higher and has excellent electric properties such as insulation, on the surface of a substrate material such as, for example, a wafer of high-purity semiconductor silicon.

Another object of the invention is to provide a novel and improved liquid composition suitable for forming a coating film having the excellent properties mentioned above on a substrate surface without the problems in the prior art coating compositions of heat-resistant polymeric materials.

A further object of the invention is to provide a method for the preparation of such a liquid coating composition based on an organosilicon compound capable of giving an organopolysiloxane-based coating film on a substrate surface.

The liquid composition of the present invention for forming a coating film on a substrate surface comprises an organic solvent and an oligomeric partial condensate of a monohydrocarbylsilane triol dissolved in the organic solvent.

The method of the present invention for the preparation of the above defined liquid composition for coating comprises the steps of dissolving a monohydrocarbylsilane triol in an organic solvent to form a solution and heating the solution to cause thickening of the solution by the partial dehydration condensation between the silanolic hydroxy groups in the monohydrocarbylsilane triol to form an oligomeric partial condensate thereof.

It is optional that, in the above described method of the invention, the monohydrocarbylsilane triol is used as a combination with a dihydrocarbylsilane diol so that the resultant oligomeric partial condensate is a co-condensate of these two types of silanol compounds.

DETAILED DESCRIPTION OF THE PREFERRED EMBODIMENTS

The main ingredient of the inventive liquid composition is, as is understood from the above definition, the oligomeric partial condensate of a monohydrocarbylsilane triol dissolved in an organic solvent. The above mentioned silane triol compound belongs to the class of silanol compounds represented by the general formula $$R_mSi(OH)_{4-m}, \tag{I}$$

in which R is a substituted or unsubstituted monovalent hydrocarbon group and m is zero or a positive integer of 1, 2 or 3. The suffix m in the formula is 1 when the silanol compound is a monohydrocarbylsilane triol. The silanolic hydroxy groups in the silanol compounds are susceptible to dehydration condensation when heated in the presence of a catalyst such as an acid to form a siloxane linkage. When the reaction of dehydration condensation is stopped at an intermediate stage, the product is a partial condensate of the silanol compound or an oligomeric organopolysiloxane having a number of silanolic hydroxy groups still remaining as bonded to the silicon atoms. Such an oligomeric partial condensate is relatively unstable and the molecules thereof can further be combined together by continued heating to effect dehydration condensation between the residual silanolic hydroxy groups to finally produce a polymeric organopolysiloxane which may be a heat-resistant resin insoluble in organic solvents depending on the functionality of the silanol compound or the mixture of the silanol compounds.

Based on the above described general knowledge in the chemistry of organopolysiloxanes, the inventors have continued extensive investigations arriving at a discovery that, when the silanol compound is a monohydrocarbysilane triol represented by the general formula $$RSi(OH)_3, \quad (II)$$

in which R has the same meaning as defined above, the oligomeric low molecular organopolysiloxane is relatively stable so that the reaction of dehydration condensation undertaken in the presence of an organic solvent can be interrupted at an intermediate stage where an oligomeric organopolysiloxane having a desired degree of polymerization has been formed while the oligomeric organopolysiloxane still has a capability of further condensation so that, when the solvent is removed by evaporation under heating, the molecules of the oligomer are combined together by the further proceeding of the dehydration condensation to form a fully cured resinous material of an organopolysiloxane exhibiting desired heat resistance and insolubility in solvents.

The above mentioned oligomeric organopolysiloxane has a degree of polymerization of 2 to about 50 and is obtained by the partial dehydration condensation of one or a combination of two kinds or more of the monohydrocarbylsilane triols represented by the above general formula (II). It is optional that the monohydrocarbylsilane triol is used as a mixture with a dihydrocarbylsilane diol or an organosilicon compound having two silanolic hydroxy groups in a molecule so that the mixture of the silanol compounds has an average functionality smaller than 3.

Accordingly, the liquid composition of the invention is obtained by dissolving the triol compound alone or, optionally, in combination with a diol compound in an organic solvent to form a solution and then heating the solution to cause partial evaporation of the solvent and the dehydration condensation between the silanolic hydroxy groups to some extent. It should be noted that it is essential that the main ingredient in the inventive liquid composition should be derived from the above mentioned triol compounds since much larger amounts of the silanolic hydroxy groups remain in the oligomeric molecules when the silanol mixture contains a considerable amount of tetrahydroxysilane, i.e. Si(OH)$_4$, so that the reaction of the dehydration condensation cannot be interrupted at a desired intermediate stage of oligomerization with further proceeding of the reaction to form macromolecules insoluble in an organic solvent and not suitable as an ingredient of a liquid composition for coating.

That is, the reaction of the the dehydration condensation between silanolic hydroxy groups can readily be interrupted at an intermediate stage of oligomerization when the silanol compound is a monohydrocarbyl triol compound according to the present invention and the oligomeric organopolysiloxane is soluble in organic solvents so that the desired liquid composition for coating can readily be obtained. In this case, the degree of polymerization or the molecular weight of the oligomer can be controlled by suitably adjusting the degree of concentration of the solution by the partial removal of the solvent by evaporation with heating.

The monohydrocarbylsilane triol compounds suitable for the preparation of the liquid composition for coating include various compounds according to the kind of the substituted or unsubstituted monovalent hydrocarbon group denoted by R in the general formula (II) as exemplified by methyl, ethyl, propyl, butyl, chloromethyl, chloropropyl, bromopropyl, 3,3,3-trifluoropropyl, vinyl, allyl, vinylphenylethyl, methacryloyloxyethyl, methacryloyloxypropyl, phenyl, chlorophenyl, benzyl, epoxycyclohexylethyl, glycidyloxypropyl, 3-methyl-3-glycidyloxybutenyl and the like groups. Among the monohydrocarbylsilane triols having the above named groups as the substituted or unsubstituted monovalent hydrocarbon group bonded to the silicon atom, methylsilane triol and phenylsilane triol are preferred, the former being more preferable from the standpoint of the higher resistance of the cured coating film against heating and solvent and the latter being more preferable from the standpoint of the better spreadability of the liquid composition over the substrate surface.

These monohydrocarbylsilane triol compounds can readily be prepared by a known method described, for example, in Japanese Patent Publication No. 52-16488 by the reaction of an alcohol with the reaction product of a corresponding monohydrocarbyl trihalogenosilane and a carboxylic acid or in Japanese Patent Publication No. 56-34234 by the addition of an inorganic acid to a mixture of a corresponding monohydrocarbyl trialkoxysilane, a carboxylic acid and an alcohol. These triol compounds may be used either singly or as a combination of two kinds or more according to need in the oligomerization reaction.

The organic solvents used for dissolving the above mentioned monohydrocarbylsilane triol to be oligomerized therein include alcohols, esters, ketones and aromatic hydrocarbons. The alcoholic solvents are exemplified by methyl alcohol, ethyl alcohol, propyl alcohol, butyl alcohol, cyclohexanol, benzyl alcohol, dimethylol benzene, furfuryl alcohol, tetrahydrofurfuryl alcohol, diacetone alcohol, ethyleneglycol monoalkyl ethers, diethyleneglycol monoalkyl ethers, triethyleneglycol monoalkyl ethers, propyleneglycol monoalkyl ethers and the like. The ester solvents are exemplified by alkyl acetates, diethyleneglycol monoalkyl ether acetates, triethyleneglycol monoalkyl ether acetates, propyleneglycol monoalkyl ether acetates, ethyl acetoacetate, alkyl lactates, alkyl benzoates, benzyl acetate, glycerin diacetate and the like. The ketones include acetone, methyl ethyl ketone, cyclohexanone, acetyl acetone, isophorone, diethyl ketone, methyl isobutyl ketone, methyl n-butyl ketone, acetonyl acetone and the like. The aromatic hydrocarbons include benzene, toluene, xylene, ethyl benzene, diethyl benzene, cumene, tetrahydronaphthalene and the like. These solvents may be used either singly or as a mixture of two kinds or more.

The liquid composition of the invention is a solution of the oligomeric organopolysiloxane formed by the partial dehydration condensation of the silanol compound represented by the above given general formula (II) as dissolved in the above named organic solvent and readily obtained by thickening a solution of an organic solution prepared by dissolving the silanol compound in the organic solvent. The method for thickening the solution is not particularly limitative. For example, the solution is gradually thickened by merely standing at room temperature but it is usually advantageous to heat the solution, preferably, with partial evaporation of the solvent in order to accelerate the reaction of dehydration condensation from the industrial standpoint. It is sometimes advantageous to carry out the heating of the solution under a reduced pressure to accelerate evaporation of the solvent to increase the concentration of the solution. The silanol compound is oligomerized by the dehydration condensation between the silanolic hydroxy groups during this step of thickening to have an increasingly larger molecular weight as the thickening proceeds. The oligomer, however, is stable in so far as it is in the solution of the organic solvent.

It is noted here that the temperature of the solution under thickening treatment should be kept at 200° C. or lower regardless of the concentration thereof since, when the solution is heated at a temperature exceeding 200° C., the dehydration condensation of the silanol compound proceeds rapidly to form a three-dimensional network structure resulting in undue increase of the viscosity of the solution with some inconvenience in handling or eventually formation of a highly crosslinked resin insoluble in organic solvents.

In short, the inventive liquid composition is prepared by first dissolving the monohydrocarbylsilane triol in the organic solvent to give a concentration of 5 to 50% by weight or, preferably, 10 to 30% by weight and then thickening this solution by heating at a temperature not exceeding 200° C. to effect dehydration condensation of the silanol compound forming a solution containing the oligomeric organopolysiloxane in the organic solvent. The concentration of the oligomer in the liquid composition of the invention is usually in the range from 10 to 70% by weight depending on the initial concentration of the silanol compound and the amount of the evaporated solvent and the viscosity of the liquid composition is preferably in the range from 2 to 200 centipoise as measured at 25° C. from the standpoint of practical applicability. It is optional that the thickening may be performed to a lesser or higher extent depending on the desired object of the use of the composition and the method of application thereof. Excessively thickened solutions can be diluted by adding an organic solvent thereto to control the viscosity so as to obtain an appropriate thickness of the film formed by the application of the solution as the inventive composition. A fully cured resin film of coating can readily be obtained of the inventive liquid composition when it is applied on to the surface of a substrate and heated at a temperature of, for example, 200° C. or higher with complete evaporation of the solvent contained therein.

The inventive liquid composition usually contain no impurities detrimental to the use in electric or electronic applications such as alkali metal and halogen ions which badly affect the electric insulation and, even when such impurities are contained in the inventive composition, they can readily be removed by a known method such as ion exchange by use of a suitable ion exchange resin. Such an ion exchange treatment for removing halogen ions can be omitted when the silanol compound is prepared starting from an alkoxy silane instead of a halogenosilane.

The liquid composition of the invention prepared in the above described manner has good spreadability on the surfaces of various kinds of substrate materials including semiconductor silicon wafers and can give a fully cured coating film of uniform thickness thereon by heating as is mentioned above. The cured coating film of the inventive composition is very stable in air even by heating at a temperature of 400° to 500° C. for a long period of time exhibiting much superior heat resistance to conventional heat-resistant synthetic resins. The cured film of the inventive composition having high purity also has excellent electric insulation and resistance against corrosion and is free from formation of cracks with good dimensional stability.

As is mentioned before, the inventive liquid composition is prepared not only from a monohydrocarbylsilane triol alone but also from a mixture thereof with a dihydrocarbylsilane diol of the formula $R_2Si(OH)_2$, where R has the same meaning as defined before, in just the same manner as in the preparation with the monohydrocarbylsilane triol alone. The combined use of such a diol compound is advantageous in respect of the improved spreadability of the composition on the substrate surface and adhesion of the coating film thereto as well as of the remarkably improved resistance against crack formation.

The heat resistance of the resin formed by the cocondensation of the triol and diol compounds is much superior to the conventional heat-resistant resins even though somewhat inferior when compared with the resin formed from the oligomeric organopolysiloxane of the triol compound alone. Therefore, the resin by the cocondensation of the diol and triol compounds is recommendable for practical applications depending on the desired heat resistance. The amount of the diol compound relative to the amount of the triol compound is not particularly limitative and should be determined in consideration of the desired heat resistance of the resin, workability of the liquid composition and the like factors although the amount of the diol compound should not exceed an equimolar amount to the triol compound since no curing can be expected with a liquid composition of a higher diol content than equimolar. In particular, the amount of the diol compound should not exceed 50% by moles based on the amount of the triol compound due to the decreased heat resistance of the cured resin formed of the liquid composition with a higher diol content.

The monovalent hydrocarbon group denoted by R in the dihydrocarbylsilane diol, which is selected from the same class for the R in the triols, can be the same as or different from the hydrocarbon group R in the monohydrocarbylsilane triol and the two hydrocarbon groups R in a diol compound can be the same with or different from each other. Several of the examples of the dihydrocarbylsilane diols are, for example, dimethylsilane diol, diphenylsilane diol, methylphenylsilane diol and the like. It is of course optional that two kinds or more of the diol compounds are used in combination.

It should be noted that the above mentioned improvements in several respects obtained by the combined use of a dihydrocarbylsilane diol are obtained equally with an organosilicon compound having two silanolic hydroxy groups in a molecule in general. Various compounds can be named as the examples of such organosilicon compounds other than the dihydrocarbylsilane diols $R_2Si(OH)_2$ and one of the useful ones is 1,4-bis(-dimethylhydroxysilyl)benzene of the formula

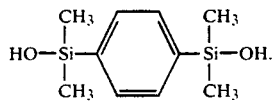

In the following, the present invention is illustrated in further detail by way of examples, which should be construed by no means to limit the scope of the invention.

PREPARATION 1

Into 360 g (6 moles) of acetic acid taken in a three-necked flask of 2-liter capacity were gradually added 298 g (2 moles) of methyl trichlorosilane $CH_3SiCl_3$ and the mixture was gently warmed by dipping the flask in a hot water bath for 3 hours while the mixture was continuously agitated and the hydrogen chloride formed by the reaction was removed under reduced pressure to give methyl triacetoxysilane.

In the next place, methyl alcohol was added to the above prepared methyl triacetoxysilane to give a total amount of 1600 g of the solution which was kept at 50° C. for 12 hours to effect aging into a solution of methylsilane triol $CH_3Si(OH)_3$ in methyl alcohol having a viscosity of 0.81 centipoise at 25° C.

The reaction was almost quantitative.

PREPARATION 2

The procedure was substantially the same as in Preparation 1 above except that the amount of the acetic acid was decreased to 240 g (4 moles) and the methyl trichlorosilane was replaced with 254 g (2 moles) of dimethyl dichlorosilane $(CH_3)_2SiCl_2$ to give 1600 g of a solution of dimethylsilane diol in methyl alcohol having a viscosity of 0.83 centipoise at 25° C.

EXAMPLE 1

A mixture prepared by mixing 80 g of the solution obtained in Preparation 1, 20 g of the solution obtained in Preparation 2 and 20 g of ethyleneglycol monoethyl ether acetate was taken into a rotary evaporator connected to an aspirator and kept in a water bath at 40° C. and concentrated for 2 hours until the total amount of the mixture had decreased to 40 g. The viscosity of the thus obtained solution containing the oligomeric organopolysiloxane was 3.0 centipoise at 25° C. showing a substantial increase over the starting solutions of the silanol compounds. This oligomeric organopolysiloxane was soluble in methyl alcohol, ethyl alcohol and acetone.

Three drops of this oligomer solution were put on the center of a horizontally held silicon wafer of 2 inch diameter having a mirror-polished surface which was then rotated at 2000 r.p.m. for 20 seconds to have the solution spread over whole surface of the wafer. The silicon wafer thus coated with the solution was heated first at 150° C. for 30 minutes and then at 400° C. for 60 minutes so that the oligomeric organopolysiloxane was converted into a cured coating film of the organopolysiloxane of a uniform thickness of about 700 nm.

The thus obtained coating film was highly resistant against attack of chemicals including orgainc solvents, acids and alkalis and no erosion was noted even by dipping of the coated wafer for several hours in a hydrofluoric acid solution of 48% concentration.

In the next place, the coated silicon wafer was baked in air for 60 minutes at 500° C. and the thickness of the coating film was determined to be 660 nm showing a decrease of about 5%. No further decrease was noted in this film thickness even when the coated silicon wafer was baked prolongedly for an additional time of 60 minutes at 500° C. The pencil hardness of the thus baked coating film was 8H to 9H.

PREPARATION 3

Into 613 g (6 moles) of acetic anhydride taken in a three-necked flask of 3-liter capacity were gradually added 423 g (2 moles) of phenyl trichlorosilane $C_6H_5SiCl_3$ to form a uniform mixture which was kept standing for 6 hours to effect reaction and aging. The acetyl chloride formed by the reaction in the above mixture was removed by distillation under reduced pressure with the flask dipped in a hot water bath to leave 560 g of powdery phenyl triacetoxysilane in an almost quantitative yield. This product was dissolved by adding 200 g of methyl alcohol and acetone in an amount sufficient to make the total amount of 1600 g of the solution. This solution was kept standing at room temperature for 7 days to quantitatively convert the phenyl triacetoxysilane into phenylsilane triol $C_6H_5Si(OH)_3$ in the solution. The viscosity of this solution was 0.77 centipoise at 25° C.

PREPARATION 4

The procedure was substantially the same as in Preparation 3 above except that the amount of the acetic anhydride was decreased to 409 g (4 moles) and the phenyl trichlorosilane was replaced with 506 g (2 moles) of diphenyl dichlorosilane $(C_6H_5)_2SiCl_2$ to give 1600 g of a solution of diphenylsilane diol $(C_6H_5)_2Si(OH)_2$ in a solvent mixture of methyl alcohol and acetone. The viscosity of this solution was 0.78 centipoise at 25° C.

EXAMPLE 2

A mixture prepared by mixing 70 g of the solution obtained in Preparation 3, 30 g of the solution obtained in Preparation 4 and 20 g of xylene was heated at 70° C. for 4 hours in a flask on a hot water bath to be concentrated into about 40 g of a residual solution containing an oligomeric organopolysiloxane formed by the cocondensation of the silanol compounds. The viscosity of this oligomer solution was 23 centipoise at 25° C.

A cleaned glass plate of 5×5 cm wide and 1.1 mm thick was uniformly coated with this oligomer solution in a spinner by putting 5 drops of the solution at the center of the plate and then rotating it at 2000 r.p.m. for 20 seconds. The thus coated glass plate was heated at 150° C. for 30 minutes in an air oven to evaporate the solvents and then baked at 400° C. for 60 minutes to cure the oligomer into a coating film of cured organopolysiloxane having a thickness of 2 $\mu$m. The coating film had a smooth surface having a pencil hardness of 5H and was insoluble in organic solvents.

When the baking temperature was 200° C. or below, on the other hand, curing of the coating resin film was incomplete and the film was still soluble in organic solvents such as ketones, esters, aromatic hydrocarbons, N,N-dimethyl formamide, tetrahydrofuran, N-methyl pyrrolidone and the like.

When the coated glass plate after baking at 400° C. for 60 minutes was further baked at 500° C. for 60 minutes, the thickness of the coating film was decreased from 2 μm to about 1 μm indicating that the heat resistance and solvent resistance of the here obtained coating film were somewhat inferior to those in Example 1 although the spreadability of the solution on the substrate surface was remarkably improved when applied to the same kind of the substrate surface.

EXAMPLE 3

A mixture prepared by mixing 100 g of the solution obtained in Preparation 1, 200 g of the solution obtained in Preparation 3 and 100 g of cyclohexanone was concentrated for about 2 hours by removing part of the solvents in a rotary evaporator connected to an aspirator on a hot water bath at 40° C. The amount of the thus concentrated solution was about 150 g. This solution contained the oligomeric organopolysiloxane and had a viscosity of 4 centipoise at 25° C.

A mirror-polished silicon wafer of 2 inches diameter was coated with this oligomer solution in a spinner by putting 2 drops of the solution at the center of the wafer and rotating it at 5000 r.p.m. for 20 seconds. The thus coated wafer was first heated at 150° C. for 30 minutes to evaporate the solvents and then baked for 60 minutes in an oven kept at 400° C. so that the oligomer was converted into a coating film of the cured organopolysiloxane having a uniform thickness of 500 nm and a pencil hardness of 7H. Further baking of the coated silicon wafer at 500° C. for additional 30 minutes or 90 minutes caused no cracking in the coating film although the thickness of the coating film was decreased to 480 nm after 90 minutes baking at 500° C. corresponding to a decrease of about 4%.

PREPARATION 5

A mixture was prepared with 198 g (1 mole) of phenyl trimethoxysilane $C_6H_5Si(OCH_3)_3$, 54 g (3 moles) of water and 540 g of ethyl alcohol in a glass-stoppered Erlenmeyer flask of 1-liter capacity with agitation using a magnetic stirrer and, after addition of 0.5 g of 60% nitric acid, agitation of the mixture was continued for 7 days at room temperature. The resultant solution of phenylsilane triol had a viscosity of 1.05 centipoise at 25° C.

PREPARATION 6

The procedure was substantially the same as in Preparation 5 above except that the phenyl trimethoxysilane was replaced with 182 g (1 mole) of methylphenyl dimethoxysilane and the amounts of water and ethyl alcohol were changed to 36 g (2 moles) and 582 g, respectively. The hydrolysis reaction proceeded quantitatively with addition of 0.5 g of 60% nitric acid. The resultant solution of methylphenylsilane diol has a viscosity of 1.08 centipoise at 25° C.

PREPARATION 7

The procedure was substantially the same as in Preparation 5 above except that the phenyl trimethoxysilane was replaced with 136 g (1 mole) of methyl trimethoxysilane and the amount of ethyl alcohol was increased to 610 g. The resultant solution of methylsilane triol had a viscosity of 1.04 centipoise at 25° C.

EXAMPLE 4

A mixture was prepared by mixing 4 g, 1 g and 1 g of the solutions obtained in Preparations 5, 6 and 7, respectively, and 2 g of ethyleneglycol monobutyl ether acetate and, after removal of the ethyl alcohol therefrom by distillation, the mixture was heated at 120° C. for 3 hours to effect co-oligomerization of the silanol compounds. The resultant oligomer solution had a viscosity of 8 centipoise at 25° C.

A cleaned glass plate of 5×5 cm wide and 1.1 mm thick was uniformly coated with this oligomer solution in a spinner by putting 5 drops of the solution at the center of the plate and then rotating it at 4000 r.p.m. for 10 seconds. The thus coated glass plate was heated for 30 minutes in a hot air oven at 150° C. to evaporate the solvent and then baked for 60 minutes in the oven at an increased temperature of 400° C. The coated glass plate was further baked at 500° C. for 60 minutes in an oven filled with nitrogen gas. The cured resin film formed on the glass plate with absolutely no cracks had a uniform thickness of about 1.0 μm and a pencil hardness of 7H.

PREPARATION 8

A mixture was prepared by mixing 148.5 g (0.75 mole) of phenyl trimethoxysilane, 34 g (0.25 mole) of methyl trimethoxysilane, 180 g (3 moles) of acetic acid, 200 g of methyl alcohol, 221.5 g of acetone and 5.0 g of 85% phosphoric acid and the mixture was agitated for 7 days at room temperature in a glass-stoppered flask to give a solution of a mixture of phenylsilane triol and methylsilane triol. The viscosity of this silanol solution was 0.85 centipoise at 25° C.

EXAMPLE 5

A mixture composed of 100 g of the silanol solution obtained in Preparation 8 above, 5 g of 1,4-bis(dimethylhydroxysilyl)benzene and 25 g of ethyleneglycol monoethyl ether acetate was concentrated by evaporation of the methyl alcohol, acetone and a part of ethyleneglycol monoethyl ether acetate over 3 hours in a rotary evaporator kept in a water bath at 40° C. to effect dehydration condensation of the silanol compounds. A portion of ethyleneglycol monoethyl ether acetate was again added to the thus concentrated solution so that the total amount of the solution was 50 g. The viscosity of this oligomer solution was 4 centipoise at 25° C.

A mirror-polished silicon wafer of 2 inches diameter was coated with this oligomer solution in a spinner by putting a drop of the solution at the center of the wafer and rotating it at 2000 r.p.m. for 10 seconds. The thus coated silicon wafer was heated for 30 minutes at 150° C. to evaporate the solvent and then baked first at 400° C. for 60 minutes and then at 500° C. for additional 60 minutes in a hot air oven. The cured resin film with no cracks formed on the silicon wafer had a uniform thickness of 1.5 μm and a pencil hardness of 7H.

What is claimed is:

1. An organic liquid solution for forming a heat resistant organopolysiloxane film on a surface, said solution containing from about 10 to 70% by weight of an oligomer formed from a monohydrocarbylsilane triol of the formula $RSi(OH)_3$ wherein R is a substituted or unsubstituted monovalent hydrocarbon group, the degree of polymerization of said oligomer being from 2 to about 50, said solution having a viscosity of from about 2 to 200 centipoise at 25° C.

2. A solution as in claim 1 wherein R is methyl or phenyl.

3. A solution as in claim 1 wherein the organic solvent of the solution is selected from the group consisting of alcohols, esters, ketones and aromatic hydrocarbons.

4. A solution as in claims 1, 2 or 3 additionally containing up to 50% by moles based on the number of moles of the monohydrocarbylsilane triol of a dihydrocarbylsilane diol of the formula $R_2Si(OH)_2$ wherein R is a substituted or unsubstituted monovalent hydrocarbon group.

5. A process of forming an organic liquid solution for forming a heat resistant organopolysiloxane film on a surface which comprises:

6. A process as in claim 5 wherein R is methyl or phenyl.

7. A process as in claim 5 wherein the organic solvent of the solution is selected from the group consisting of alcohols, esters, ketones and aromatic hydrocarbons.

8. A process as in claims 5, 6 or 7 additionally containing up to 50% by moles based on the number of moles of the monocarbylsilane triol of a dihydrocarbylsilane diol of the formula $R_2Si(OH)_2$ wherein R is a substituted or unsubstituted monovalent hydrocarbon group.

* * * * *